United States Patent
Marks

[19]

[11] Patent Number: 6,002,329

[45] Date of Patent: *Dec. 14, 1999

[54] EARLY WARNING BRAKING SYSTEM

[76] Inventor: LaKeith Anthony Marks, 17700 S. Avalon Blvd. #217, Carson, Calif. 90746

[*] Notice: This patent is subject to a terminal disclaimer.

[21] Appl. No.: 09/103,125

[22] Filed: Jun. 23, 1998

Related U.S. Application Data

[63] Continuation-in-part of application No. 08/968,647, Nov. 12, 1997.

[51] Int. Cl.$^6$ .................................................. B60Q 1/50
[52] U.S. Cl. ........................ 340/467; 340/479; 307/10.8; 315/77; 180/272; 180/282; 250/221
[58] Field of Search .................................. 340/467, 468, 340/479, 463, 464, 471, 472, 478; 307/10.8; 315/77, 80; 180/272, 271, 282; 250/221

[56] References Cited

U.S. PATENT DOCUMENTS

4,840,248   6/1989   Silverman ................................. 180/272

*Primary Examiner*—Nina Tong

[57] ABSTRACT

The present invention relates to an early warning braking system whereby drivers are provided with the greatest opportunity to avoid a collision. This is accomplished by placing one or more photo sensor switches inside a vehicle to monitoring a driver's foot motion. The beam from the photo sensor switch is positioned in the path that the driver's foot would have to travel to apply the brakes. When the braking process occurs, the driver's foot breaks an optical beam (optical circuit), which is detected by a sensor. The sensor then triggers a relay switched that illuminates the brake lights, before engagement with the brake pedal, thereby illuminating the brake lights a moment in time before they would normally be illuminated. At 60 miles per hour this could give a driver an additional 22 to 88 extra feet of breaking distance.

3 Claims, 10 Drawing Sheets

EARLY WARNING BRAKING SYSTEM

This application is a continuation in part of the parent application Ser. No. 08/968,647 filed Nov. 12, 1997 now pending.

BACKGROUND OF THE INVENTION

1. Field of the Invention

The present invention relates to auto safety devices, and more particularly, to an auto safety device, which alerts a driver in a first vehicle, following a second vehicle, of the second vehicles impending stop.

2. Description of the Prior Art

In the field of auto safety, various measures have devised in order to reduce accident fatalities. Most recent efforts have concentrated on advanced Air bag deployment methods to prevent passenger impact with the windshield and dashboard. Older approaches to auto safety involve improved bumpers and reinforced chassis designs.

In reality, however, no matter the effectiveness of impact minimizing devices, automobile collisions will always produce some injury. Moreover, regardless of automobile occupant injury, the shear cost of automobile accidents warrants attention. There is a compelling need for a device which prevents collisions from occurring.

While devising means to prevent passenger auto injuries is laudatory, the real solution to auto safety lies in accident prevention. No matter the number of safety devices designed to minimize auto passenger impact with the auto itself, there is no substitute for accident avoidance. Even with the various safety devices available today, accident statistics are staggering.

One of the most basic automobile collisions is the rear-end collision. Traffic moves and pauses so often during a typical drive that preventing rear-end collisions would significantly impact accident statistics. The frequency of rear-end collisions is staggering.

As described in the January 1997 Department of Transportation's Report to Congress on the National Highway Traffic Safety Administration Intelligent Transportation System Program, rear-end fatalities are of utmost concern.

"A rear-end crash occurs when the front of a vehicle strikes the rear of a leading vehicle, both in the same lane. In 1994, there were approximately 1.66 million police-reported rear-end crashes. These crashes accounted for over 920,000 injuries and 1,160 fatalities. It is estimated that about 50 percent of these crashes could be avoided by collision avoidance systems that could sense stopped or moving vehicles in the forward lane."

In fact, the United States Government has dedicated resources to implementing a solution to the rear-end accident problem. The program, termed the Rear-end Collision Avoidance System (RECAS), is a long range attempt to introduce non-human responses to the driving environment.

"The rear-end collision avoidance system (RECAS) concept is to monitor the forward path of the host vehicle, detect other vehicles and objects, and help the driver maintain a safe headway relative to a preceding vehicle (Category 1 system) or warn the driver if a collision is imminent (Category 2 system). At present, the technology to provide effective rear-end collision avoidance systems is generally believed to be more advanced than systems for some other collision types (e.g., run-off-the-road.).

Intelligent cruise control (ICC) systems, currently being introduced to consumers abroad, will provide the foundation and experience to develop deployable RECAS. ICC systems do not detect stationary vehicles and will be capable of being activated by the driver at speeds above a manufacturer determined threshold. However, NHTSA views this project as a high priority effort since ICC has the potential for introduction of effective products by the automotive industry within the next 5–8 years."

Unfortunately, the government has not found a solution to rear-end collisions which can be implemented immediately. While the government has made preventing accidents a priority, there are several obstacles to overcome. For example, how will computer controlled devices interface with a driver? Will the automobile act on its own to avoid an accident, or will computer sensor devices enhance a driver's response time? An approach to integrating computers and humans has been realized by the Department of Transporation.

"This project has developed performance requirements (both hardware and human factors) for advanced technologies to prevent or decrease the severity of rear-end crashes. This involves the identification of requirements for major system components (or subsystems) such as candidate sensor, processor, driver warning/interface, and control elements. This project is oriented toward countermeasure systems that would be self-contained within the vehicle, although it does not exclude from consideration those countermeasures that may require, or be improved by auxiliary equipment installed on the roadside or in other vehicles."

Clearly, a need exists for a reliable safety system which can be installed within a vehicle. The safety system will aim to prevent rear-end collisions by committing modern technology to a driver's learned behavior.

In summary, at the forefront of many individuals minds is preventing accidents before they occur. While air bags and seat belt laws have contributed to the reduction of accident fatalities, they are simply remedial measures. To effectively save lives, and lower insurance premiums, a method must be developed which is prophylactic.

The prior art discloses a number of safety devices, none of which speed the response time of the driver.

U.S. Pat. No. 4,988,862, issued to Beltz on Jan. 29, 1991, shows an optical occupant restraint activation sensor which works in conjunction with air bag systems to protect automobile passengers from front end collisions.

U.S. Pat. No. 5,330,226, issued to Gentry et al. on Jul. 19, 1994, shows a method and apparatus for detecting an out of position occupant. There is no photo sensor for detecting a driver's foot moving above the brake pedal of an automobile.

U.S. Pat. No. 5,410,148, issued to Barron, Jr. et al. on Apr. 25, 1995, shows a safety switch system with photooptical and capacitance detection for control of industrial machines.

U.S. Pat. No. 5,482,314, issued to Corrado et al. on Jan. 9, 1996, shows an automotive occupant sensor system which detects the characteristics of an individual in order to deploy and air bag.

U.S. Pat. No. 5,528,698, issued to Kamei et al. On Jun. 18, 1996, shows an automotive occupant sensing device which determines whether a suitable passenger is sitting in a seat before an air bag is deployed.

Therefore, there exists a need for an early warning braking system which employs conventional photooptical technology to increase the speed at which brake lights are illuminated.

SUMMARY OF THE INVENTION

The present invention was devised after the witnessing of a rear-end auto collision.

The applicant realized that traditional methods of warning other drivers of an impending deceleration or stop could be improved upon. Recognizing that in order to decrease the likelihood of a collision, drivers need, at the earliest possible moment, to be provided with information indicating a breaking is about to, or is occurring, the applicant has devised the present invention.

Early notification that another vehicle is about to stop would allow other vehicles the greatest possible breaking distance. By monitoring foot movement prior to engagement with the brake pedal, an early warning mechanism could be accomplished. Ergo, the present invention, the Early Warning Braking System optically monitors foot motion.

The applicant has devised a system, which triggers an automobile's rear brake lights prior to the actual vehicle deceleration. According to the present invention, once a driver begins braking, his/her foot moves from the accelerator or a resting position (if the cruise control is engaged), toward the brake pedal. On its journey to the brake pedal, the foot breaks a predetermined optical beam; thereby, telegraphing the drivers intend to slow his/her vehicle. The optical beam is constantly monitored via a sensor, and when the beam is broken it is no longer detected by the sensor and the vehicle's brake lights are instantly illuminated.

The present invention provides the driver behind the slowing vehicle up to one second of additional stopping time; at 60 miles per hour, that is 88 feet of extra stopping distance which decreases the opportunity for vehicular impact.

Accordingly, it is a principal object of the invention to provide a means to warn other drivers of an impending braking.

It is another object of the invention to provide a means of monitoring foot motion prior to engagement with the brake pedal.

It is a further object of the invention to provide a means for illuminating the brake light upon breaking this optical beam.

It is yet another object of a invention to provide other drivers with the greatest possible stopping distance, in the event of an emergency stop.

It is still a further object of the invented to provide greater safety on the roads.

It is an object of the invention to provide improved elements and arrangement thereof in an apparatus for the purpose described which is inexpensive, dependable and fully effective in accomplishing its intended purpose.

These and other objects of the present invention will become readily apparent upon further review of the following specifications and drawings.

DESCRIPTION OF PREFERRED EMBODIMENTS OF THE INVENTION

Although certain specific terms are used in this description for the sake of clarity, these items are intended to describe only the particular structure of the invention selected for illustration in the drawings, and are not intended to define or limit the scope of the invention.

Figure 1:
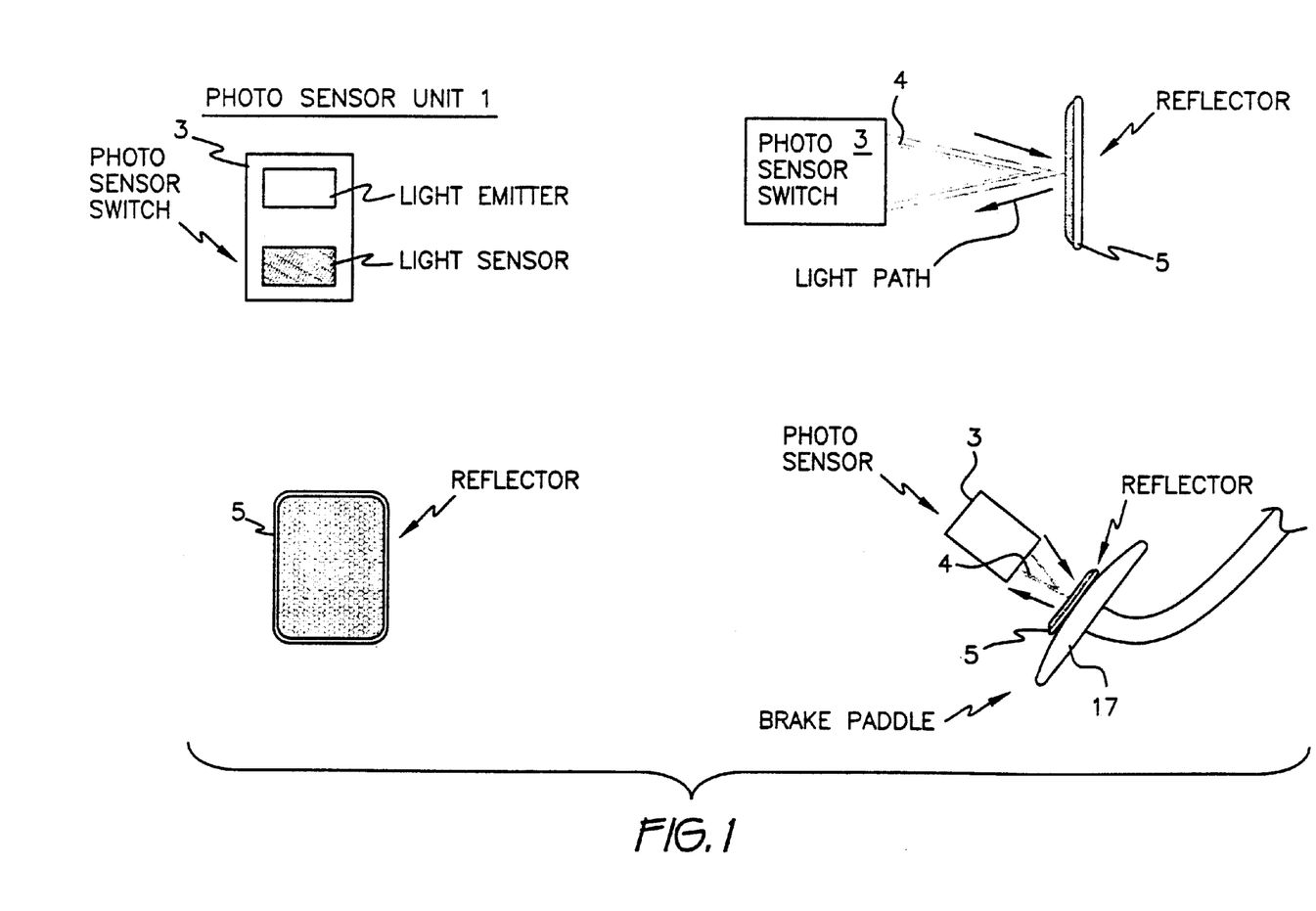
FIG. 1 is a perspective view of a photo sensor unit and reflector in accordance with a preferred embodiment of the invention. The photo sensor and photo or light emitter are built in one housing.

As shown in FIG. 1 the photo sensor unit is illustrated in a preferred embodiment. The photo sensor and light emitter are housed in one unit 3. In this case a reflector 5 is need to send the photo beam 4 to the photo sensor 3. The reflector 5 is mounted on the very edge of the brake pedal 17 (right or left, depending on the path to the brake pedal 17 that the driver's foot will take). The photo sensor 3 is mounted under the dashboard perpendicular to the reflector 5.

Figure 2:
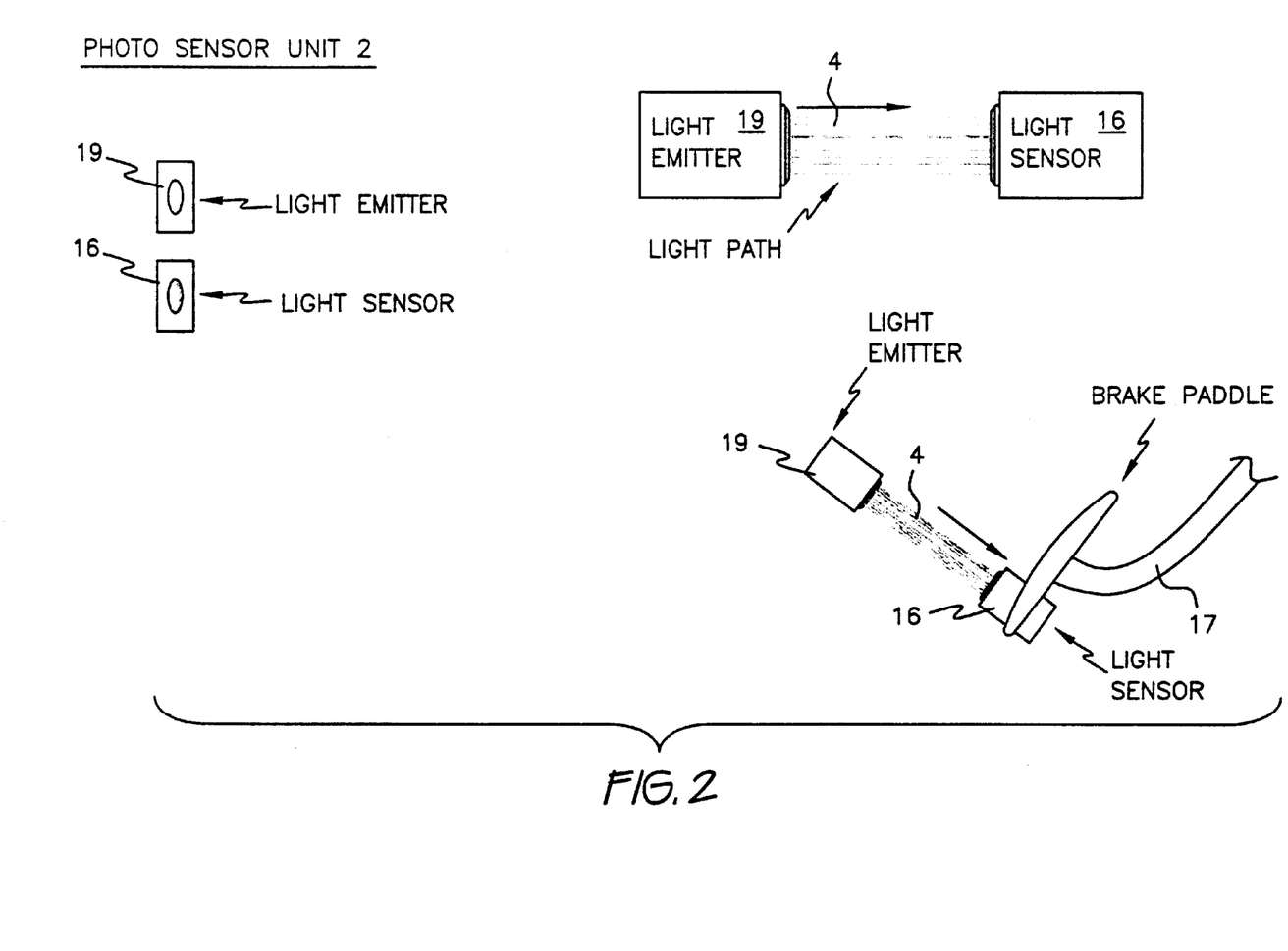
FIG. 2 is a perspective view of a photo sensor unit in accordance with its preferred embodiment of the invention. In this unit the photo sensor and photo or light emitter are separate devices which must be aligned, to form one working unit.

The photo sensor unit that is illustrated in a preferred embodiment of the invention in FIG. 2 shows a photo sensor unit that's made up of a photo or light sensor 16 and a photo or light emitter 19 as two separate devices working together. In FIG. 2 the light emitter 19 is mounted on the brake pedal 17 and the light or photo sensor 16 is mounted above it under the dashboard (the photo sensor 16 and photo or light emitter 19 can be mounted in reverse order). The photo sensor 16 and photo or light emitter 19 must be facing each other and in alignment so that the photo sensor receives the photo or light beam 4 from the light emitter.

Figure 3:
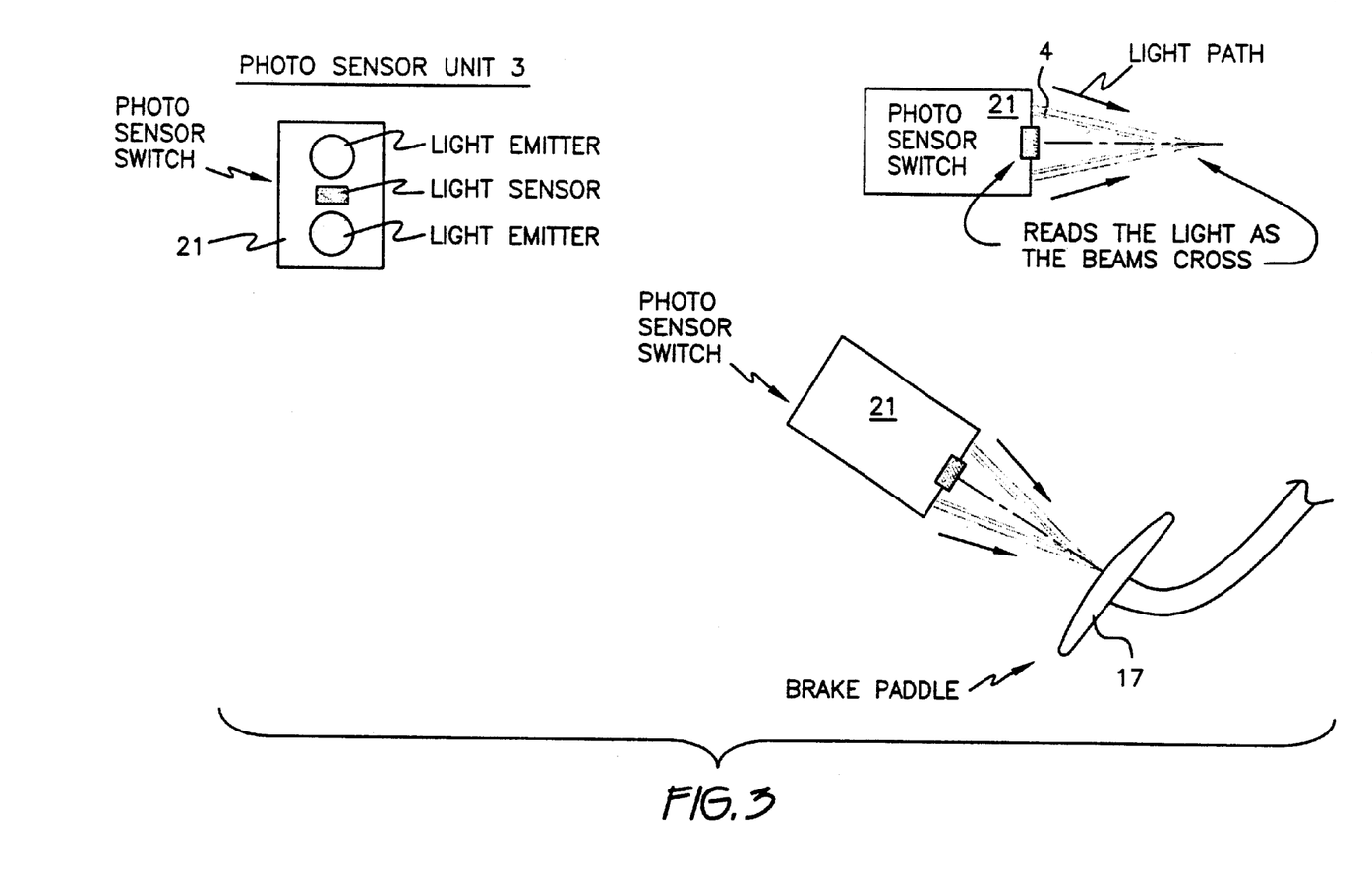
FIG. 3 is a perspective view of a photo sensor unit in accordance with a preferred embodiment of the invention. In this unit there are multi photo or light emitters and one sensor, built in a single housing. The sensor detects the beans as they meet.

In FIG. 3 the illustrated preferred embodiment of the photo sensor switch unit 21 in the invention has multi photo or light emitters and a photo or light sensor housed in one unit. The beams 4 from the photo emitters meet at a point that is predetermined by the designed of the photo sensor switch unit 21, this meeting is detected by the photo sensor at the point where they come together. The photo sensor switch unit is mounted under the dashboard over the brake pedal 17. The distance between the photo sensor switch unit 21 and the brake pedal 17 should be set so that the beams 4 come together a fraction before meeting the brake pedal 17, this distance will very according to the type and design of the sensor.

Figure 4:
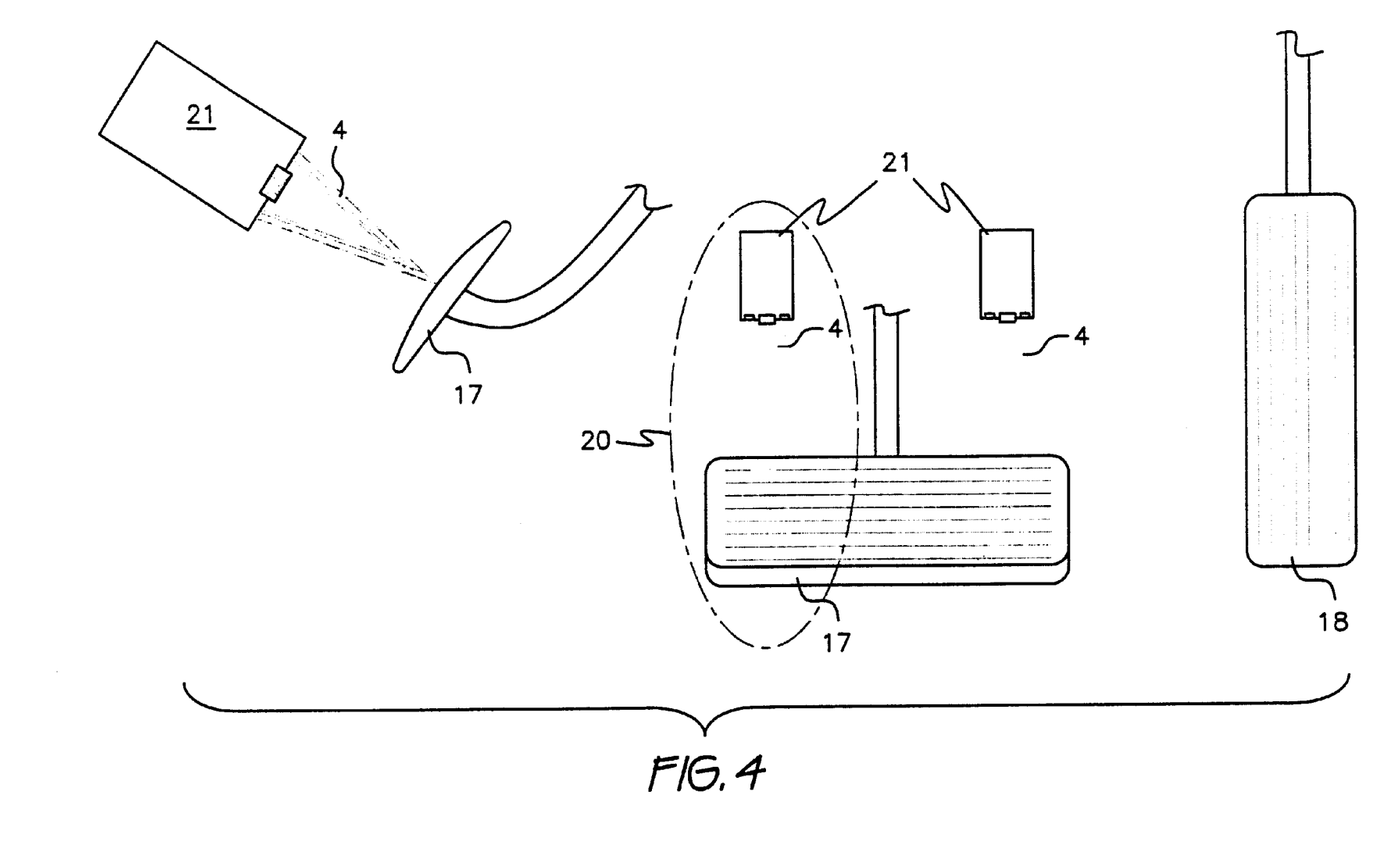
FIG. 4 is a perspective front and side view of the preferred embodiment of the invention using the unit shown in FIG. 3. Note; the distance between the brake pedal and the photo sensor switch unit should be such, that the beams meet a fraction before meeting the brake pedal. This distance will vary according to the range of the sensor.

The illustration in FIG. 4 is a perspective front and side view of the preferred embodiment of the invention using the photo sensor switch unit 21 that is shown in FIG. 3. The side view of the preferred embodiment shows the photo sensor switch unit 21 is mounted over the brake pedal 17 at such a distance that the beams 4 meet just before they reach the brake pedal 17. This space between the brake pedal 17 and the apex of the beams 4 is necessary to allow the sensor the opportunity to detect the beams 4 where they meet. If the meeting of the beams 4 are obstructed by an object they will not be detected by the sensor.

The perspective front view of the embodiment shows the invention in relationship to the accelerator pedal 18. Most drivers drive with one foot, which operates the accelerator pedal 18 and the brake pedal 17. In this case, in the process of stopping the vehicle the driver's foot would leave the accelerator pedal 18 and cross over to the brake pedal 17. This action would interrupt the beams 4 and the sensor will not be able to detect them. If the driver breaks with his left foot, an optional or additional 20, photo sensor switch unit can be used.

Figure 5:
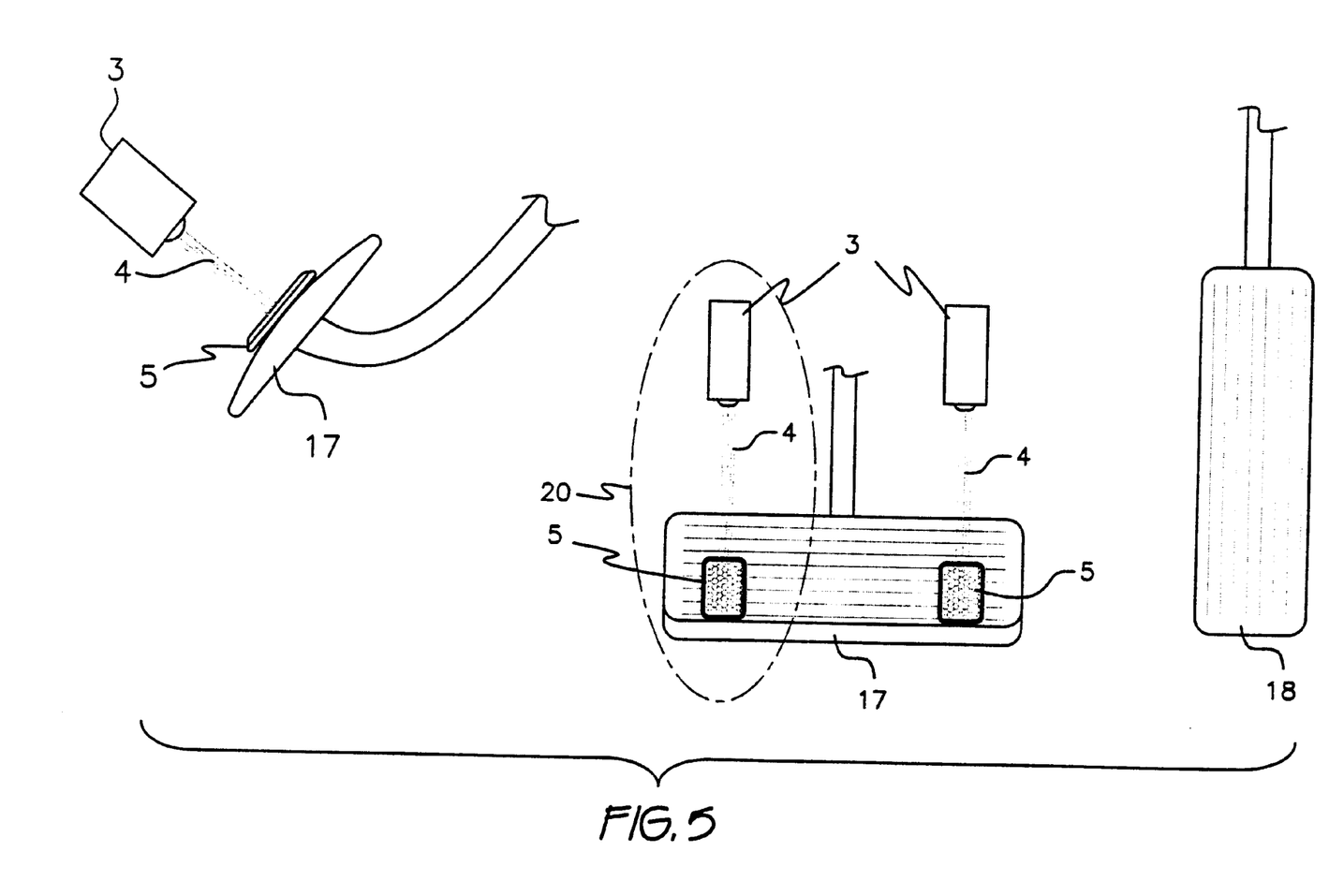
FIG. 5 is a perspective front and side view of the preferred embodiment of the invention using the unit shown in FIG. 1. Note; the photo sensor switch unit and the reflector must be perpendicular to one another.

The illustration in FIG. 5 is a perspective front and side view of the preferred embodiment of the invention, using the photo sensor switch unit 3 as shown in FIG. 1. This illustration shows the photo sensor switch 3 mounted under the dashboard and over the top of the brake pedal 17. A reflector 5 is shown in this illustration which must be used to return the photo beam 4 to the photo sensor switch 3. The reflector is mounted on the top of the brake pedal 17 (preferably in the lower right corner, if the driver drives with only the tight foot). The photo sensor switch 3 and the reflector 5 must be perpendicular to one another to function properly.

The perspective front view of the embodiment shows the invention in relationship to the accelerator pedal 18. As in FIG. 4 the driver's foot must interrupt the beam 4 in the process of crossing from the accelerator pedal 18 over to the brake pedal 17 prior to breaking. If the driver uses his left foot when breaking, an optional or additional 20, photo sensor switch unit and reflector can be used.

Figure 6:
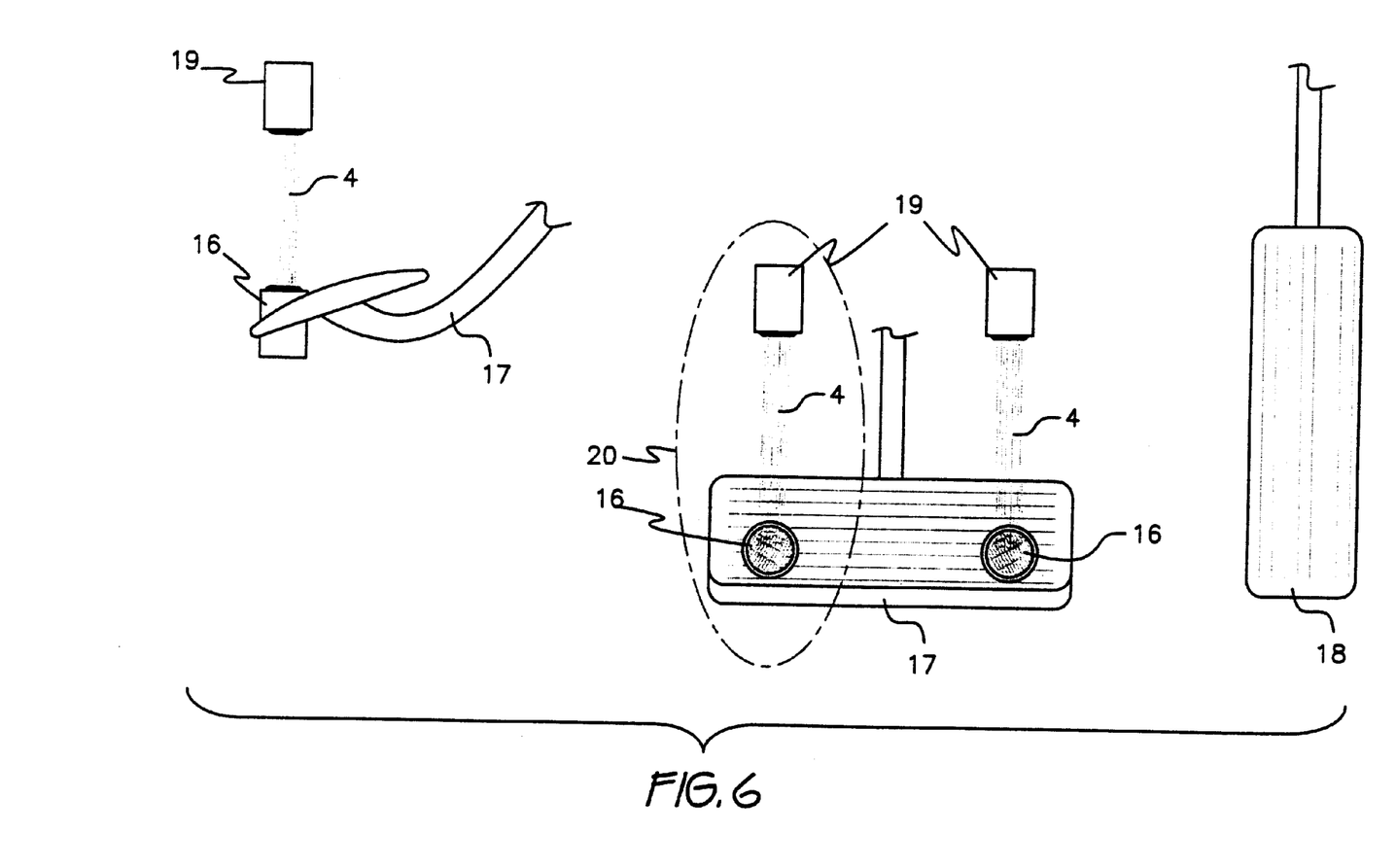
FIG. 6 is a perspective front and side view of the preferred embodiment of the invention, using the unit shown in FIG. 2 Note; the photo sensor and photo emitter must be aligned or perpendicular to one another.

Shown in FIG. 6 is a perspective front and side view of the preferred embodiment of the invention, using the photo sensor 16 and photo or light emitter 19 which are also shown in FIG. 2. The side view in FIG. 6 clearly shows the photo sensor 16 mounted in the brake pedal 17, this is preferred but not binding. However, the photo or light emitter 19 and the photo sensor 16 must be aligned and facing each other so that the photo sensor 16 can receive the photo or light beam 4 from the photo or light emitter 19. The light or photo emitter 19 is mounted under the dashboard over the photo sensor. It is OK to mount the photo sensor 16 and the photo or light emitter 19 in reverse order.

The front view of the preferred embodiment shown in FIG. 6 shows the relationship of the invention and the accelerator pedal 18. As in FIG. 4 and FIG. 5 the journey to the brake pedal 17 from the accelerator pedal 18 will interfere with the photo or light beam 4. If the drivers break from the left side of the brake pedal 17, an optional or additional 20, photo sensor switch unit can be used.

Figure 7:
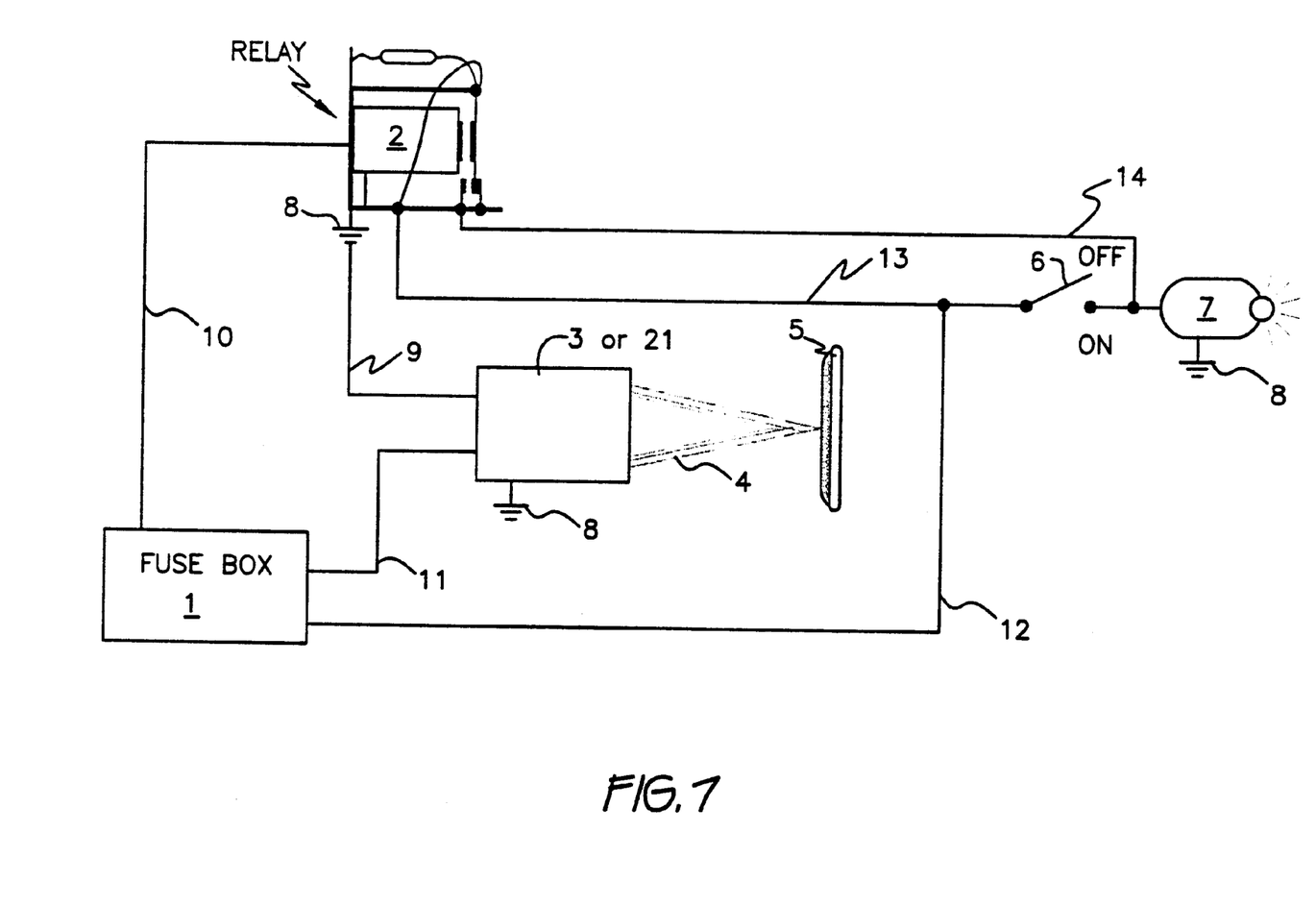
FIG. 7 is a wiring diagram for photo sensor switch units 1 and 3 as shown in FIGS. 1 and 3.

A wire diagram is shown in FIG 7. Here each item is laid out to show how it relates to the invention and their wire connections: The fuse box 1 supplies power to the devices by power wire or hot wires 10, 11, and 12. Power wire 10 carries power from a fuse in the fuse box 1 to the relay 2. Power wire 11 carries power from a fuse in the fuse box 1 to the photo sensor switch unit 3 or 21. Power wire 12 carries power from a fuse in the fuse box 1 to the standard brake light switch 6 and also to wire 13. Wire 13 carries power from wire 12, into the relay 2. The power from 13 will set dormant in the relay 2 until the relay is activated by photo sensor switch 3 or 21. Photo sensor switch 3 or 21 activates the relay 2 by the trigger wire 9. The trigger wire 9 completes the negative or grounding of the relay 2 through the ground wire 8. The ground wire is used because the photo sensor switch has a negative or ground output. If preferred, a photo sensor switch 3 or 21 with a positive output could be used. In this case the ground wire 8 would already be connected and the photo sensor switch 3 or 21's trigger wire 9 would be used in the place of power wire 10 to complete the power connection to the relay 2.

The photo sensor switch 3 or 21 activates the relay 2 when the path of the photo or light beams 4 is interrupted. When the relay 2 is activated a breaker inside the relay 2 completes the connection between wire 13 and wire 14. The power that was dormant in the relay 2 is carried through wire 14 bypassing the standard brake light switch 6 to energize the brake lights 7.

Figure 8:
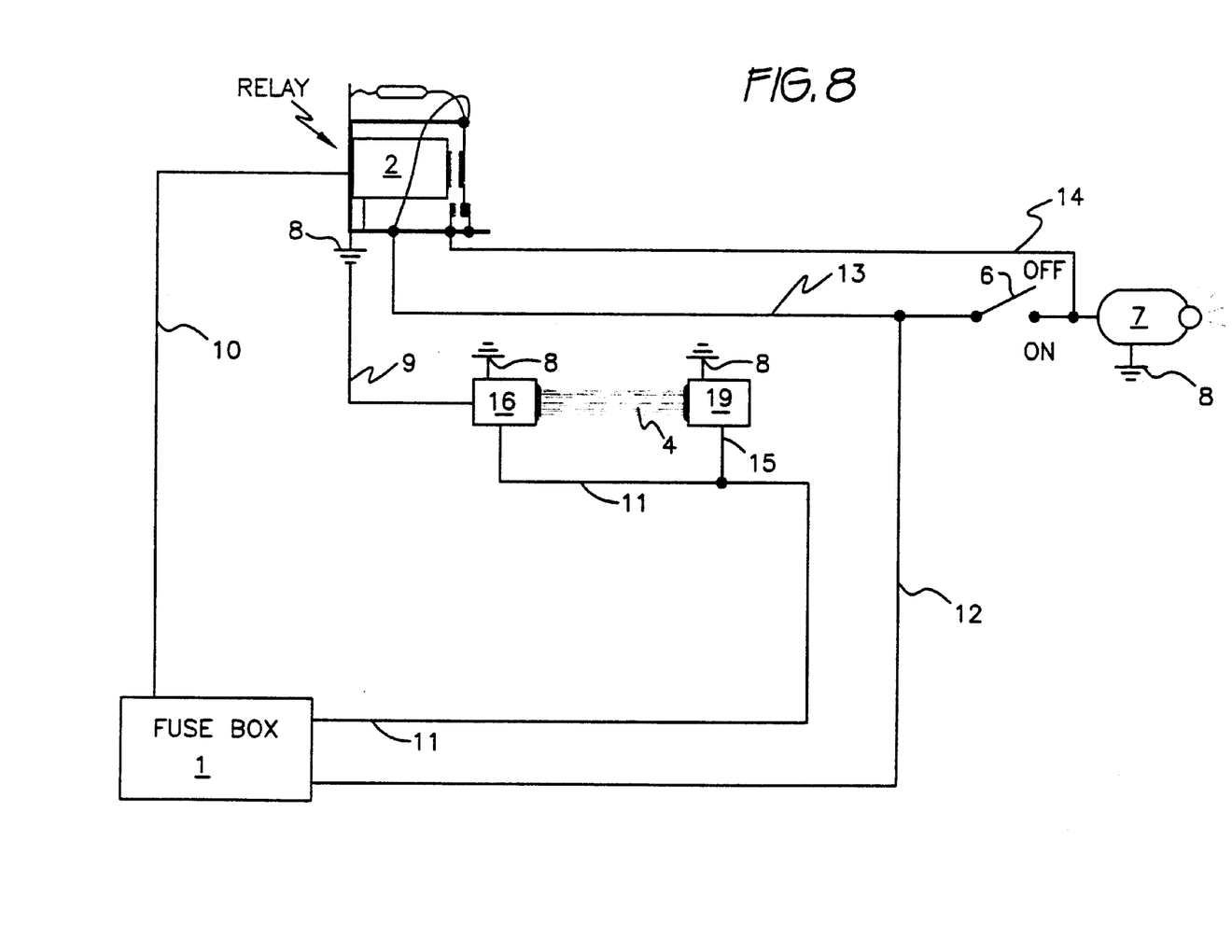
FIG. 8 is a wiring diagram for photo sensor switch unit 2 as shown in FIG. 2.

The relationship of the items in FIG. 8 is very similar to those in FIG. 7. Most of the items are the same, The fuse box 1 supplies power to the devices by power wire or hot wires 10, 11, and 12. Power wire 10 carries power from a fuse in the fuse box 1 to the relay 2. Power wire 11 carries power from a fuse in the fuse box 1 to the photo or light sensor 16. The power wire 11 also has a jumper wire 15. The jumper wire 15 carries power to the light or photo emitter 19. Power wire 12 carries power from a fuse in the fuse box 1 to the standard brake light switch 6 and also to wire 13. Wire 13 carries power from wire 12, into the relay 2. The power from 13 will set dormant in the relay 2 until the relay 2 is activated by photo or light sensor 16. Photo or light sensor 16 activates the relay by the trigger wire 9. The trigger wire 9 completes the negative or grounding of the relay 2 through the ground wire 8. The ground wire is used because the photo sensor switch has a negative or ground output. If preferred, a photo or light sensor 16 with a positive output could be used. In this case the ground wire 8 would already be connected and the photo or light sensor 16's trigger wire 9 would be used in the place of power wire 10 to complete the power connection to the relay.

The photo or light sensor 16 activates the relay 2 when the path of the photo or light beams 4 is interrupted. When the relay 2 is activated a breaker inside the relay 2 completes the connection between wire 13 and wire 14. The power that was dormant in the relay 2 is carried through wire 14 bypassing the standard brake light switch 6 to energize the brake lights 7.

Figure 9:
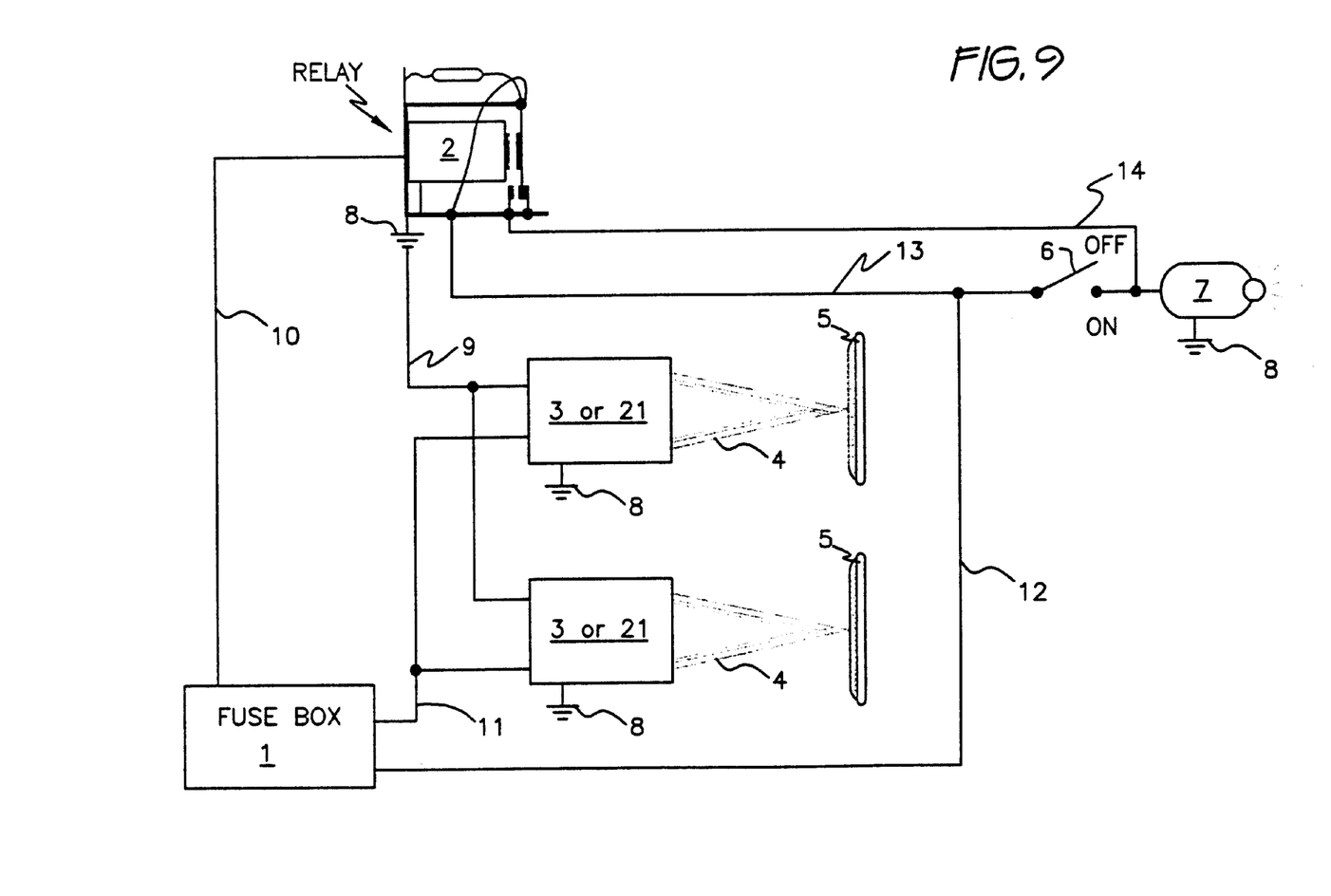
FIG. 9 is an optional wiring for photo sensor switch units 1 and 3 as shown in FIGS. 1 and 3 for use with multi photo sensor switch units.

The illustration shown on FIG. 9 is identical to FIG. 7 except this wire diagram has two photo sensor units, which are wired parallel to each other. The fuse box 1 supplies power to the devices by power wire or hot wires 10, 11, and 12. Power wire 10 carries power from a fuse in the fuse box 1 to the relay 2. Power wire 11 carries power from a fuse in the fuse box 1 to the two photo sensor switch units 3 or 21. Power wire 12 carries power from a fuse in the fuse box 1 to the standard brake light switch 6 and also to wire 13. Wire 13 carries power from wire 12, into the relay 2. The power from 13 will set dormant in the relay 2 until anyone of the photo sensor switches 3 or 21 activates the relay 2. Photo sensor switches 3 or 21, activates the relay 2 by the trigger wire 9. The trigger wire 9 completes the negative or grounding of the relay 2 through the ground wire 8. The ground wire 8 is used because the photo sensor switch units 3 or 21 have a negative or ground output. If preferred, the photo sensor switch units 3 or 21 with a positive output could be used. In this case the ground wire 8 would already be connected and the photo sensor switches 3 or 21's trigger wire 9 would be used in the place of power wire 10 to complete the power connection to the relay 2.

The photo sensor switches 3 or 21 activates the relay 2 when the path of the photo or light beams 4 are interrupted. When the relay 2 is activated a breaker inside the relay 2 completes the connection between wire 13 and wire 14. The power that was dormant in the relay 2 is carried through wire 14 bypassing the standard brake light switch 6 to energize the brake lights 7.

Figure 10:
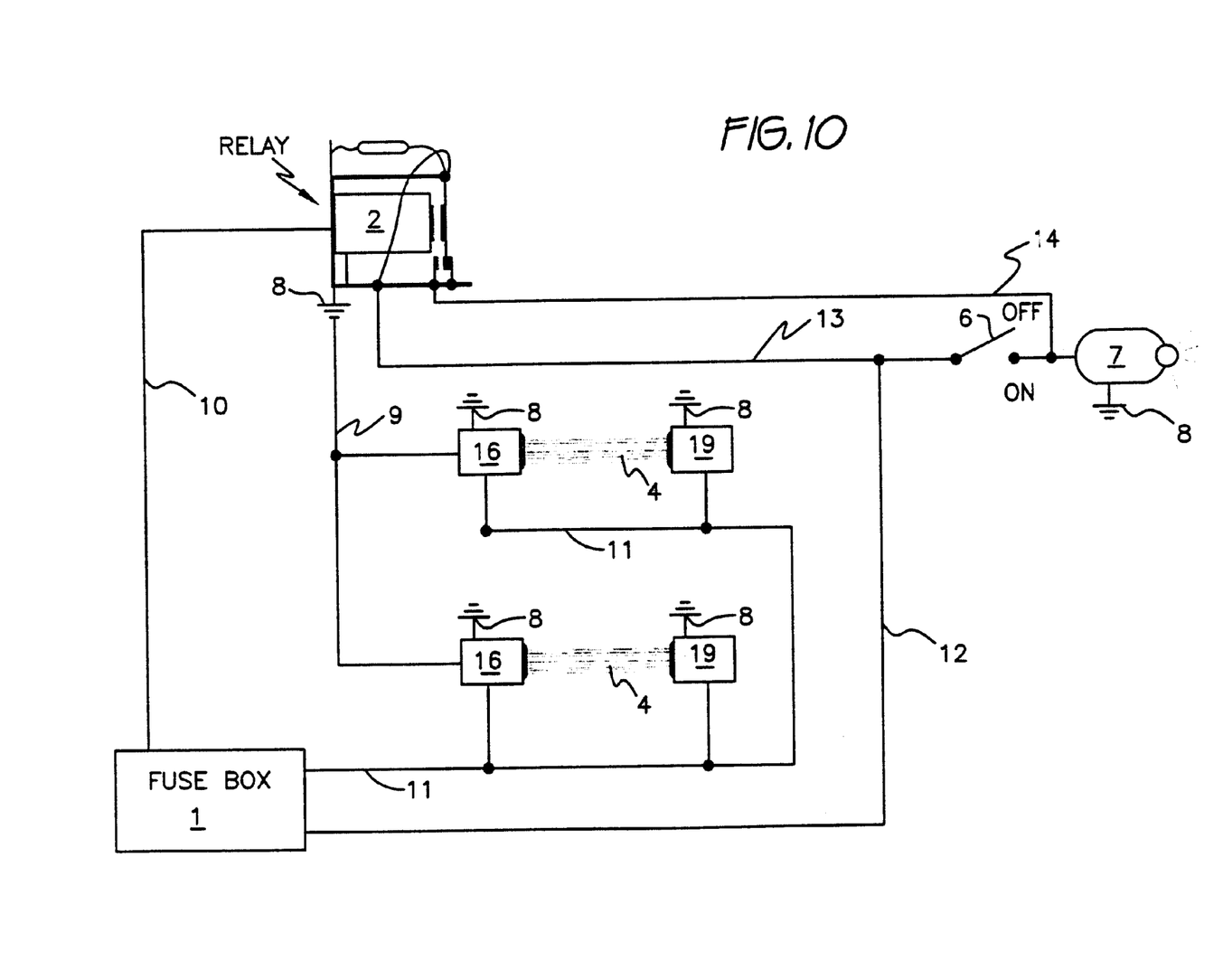
FIG. 10 is an optional wiring diagram for photo sensor switch unit 2 as shown in FIG. 2 for use with multi photo sensor switching units.

The illustration shown on FIG. 10 is identical to FIG. 8 except this wire diagram has two photo sensor units, which are wired parallel to each other. The fuse box 1 supplies power to the devices by power wire or hot wires 10, 11, and 12. Power wire 10 carries power from a fuse in the fuse box 1 to the relay 2. Power wire 11 carries power from a fuse in the fuse box 1 to the two photo or light sensors 16 and the two light or photo emitters 19. Power wire 12 carries power from a fuse in the fuse box 1 to the standard brake light switch 6 and also to wire 13. Wire 13 carries power from wire 12, into the relay 2. The power from 13 will set dormant in the relay 2 until the relay 2 is activated by anyone of the two photo or light sensors 16. Photo or light sensors 16 activate the relay 2 by the trigger wire 9. The trigger wire 9 completes the negative or grounding of the relay 2 through the ground wire 8. The ground wire is used because the photo or light sensor switches 16 has a negative or ground output. If preferred, photo or light sensors 16 with a positive output could be used. In this case the ground wire 8 would already be connected and the photo or light sensors 16's trigger wire 9 would be used in the place of power wire 10 to complete the power connection to the relay 2.

The photo or light sensors 16 activate the relay 2 when the path of anyone of the photo or light beams 4 are interrupted. When the relay 2 is activated a breaker inside the relay 2 completes the connection between wire 13 and wire 14. The power that was dormant in the relay 2 is carried through wire 14 bypassing the standard brake light switch 6 to energize the brake lights 7.

I claim:

1. An early warning braking system comprising:

brake lights;

at least one reflector is mounted to a brake pedal and at least one photo sensor switch unit is disposed in a place within a vehicle such that a light beam is positioned underneath the dashboard to complete a circuit;

wherein said photo sensor switch unit comprises at least one light emitter and at least one light sensor;

wherein the reflector for ensuring a light path between the light beam and the photo sensor switch unit;

means for illuminating at least one of said brake lights when the completed circuit is broken before the brake lights are normally illuminated by the brake pedal;

wherein the broken circuit is caused when the light path of said light beam is being obstructed by a driver's foot moving over the brake pedal, before engagement with the brake pedal during a braking process;

the light sensor activates a relay, when the light path is obstructed;

means for bypassing an existing brake light switch to illuminate at least one of said brake lights such that said brake lights can still be energized when said system is malfunction.

2. An early warning braking system comprising:

brake lights;

at least one photo sensor is mounted to a brake pedal and at least one photo emitter is disposed in a place within a vehicle such that a light beam is positioned underneath the dashboard to complete a circuit;

wherein the photo emitter is mounted perpendicular and in alignment with said photo sensor for ensuring a light path between the photo emitter and the photo sensor;

means for illuminating at least one of said brake lights when the completed circuit is broken before the brake lights are normally illuminated by the brake pedal;

wherein each broken circuit is caused when the light path of said light beam is being obstructed by a driver's foot moved over the brake pedal, before engagement with the brake pedal during a braking process;

the photo sensor activates a relay, when the light path is obstructed;

means for bypassing an existing brake light switch to illuminate at least one of said brake lights such that said brake lights can still be energized when said system is malfunction.

3. An early warning braking system comprising:

brake lights;

at least one photo sensor switch unit is disposed in a place within a vehicle such that light beams are positioned underneath the dashboard, over the brake pedal such that the beams can form an apex a fraction before reaching the brake pedal to complete a circuit;

means for illuminating at least one of said brake lights when the completed circuit is broken before the brake lights are normally illuminated by the brake pedal;

wherein each broken circuit is caused when at least one of the light paths of said light beams is being obstructed by a driver's foot moved over the brake pedal, before engagement with the brake pedal during a braking process;

the photo sensor switch unit activates a relay, when the light path is obstructed;

means for bypassing an existing brake light switch to illuminate at least one of said brake lights such that said brake lights can still be energized when said system is malfunction.

* * * * *